I. T. PRICE.
Churn.
No. 58,288.  Patented Sept. 25, 1866.
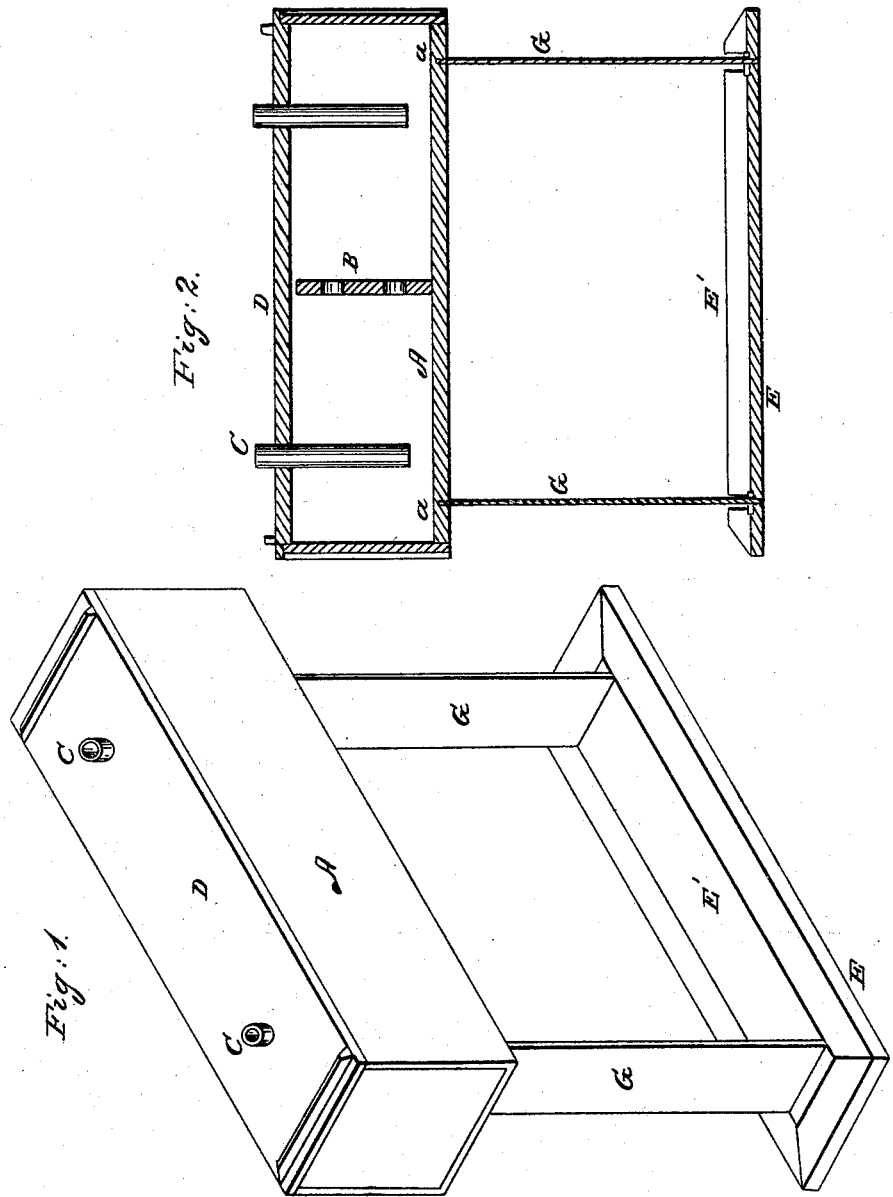
Witnesses:  Inventor:

UNITED STATES PATENT OFFICE.

ISAAC T. PRICE, OF LEESVILLE, OHIO.

IMPROVEMENT IN CHURNS.

Specification forming part of Letters Patent No. 58,288, dated September 25, 1866.

*To all whom it may concern:*

Be it known that I, ISAAC T. PRICE, of Leesville, in the county of Carroll, and in the State of Ohio, have invented certain new and useful Improvements in Churns; and I do hereby declare that the following is a full, clear, and exact description thereof, reference being had to the accompanying drawings, forming a part of this specification.

In the drawings, Figure 1 is a perspective view. Fig. 2 is a vertical section.

To enable others to make and use my invention, I will describe its construction and operation.

My invention principally consists in supporting the cream-vessel of a churn upon two flat springs fastened to a base in such a manner that the cream-vessel can be easily and rapidly vibrated like a shuttle.

A represents the cream-vessel, which is an oblong box of about fourteen inches wide, six inches deep, and thirty inches long, having a stationary perforated dasher, B, placed across the center. C C are ventilating-tubes, passing downward through lid D, so as to admit air to the cream. E is the base of the machine or the floor of the dairy.

G G are two broad, flat, and strong springs of wood or metal, secured to the floor or base E, and being about two feet apart. The upper ends of these springs rest in grooves *a a* in the bottom of the cream-vessel A; or the springs may be fastened by bolts or otherwise to the ends of vessel A. The lower ends of each spring are fastened by pins or mortises into the base-board E. It will be noticed that this base-board is made of two boards—the board E, to which the springs are fixed, and the upper board, E', which is fastened to the lower board. The springs pass through board E' without touching it, and the shoulders *a* of the mortises through this board serve as stops to limit the motion of the springs and to assist in their sudden reaction, thereby facilitating the rapid agitation of the cream.

The operation is obvious. The cream being placed in vessel A, and the lid D being applied, the operator, with one or both hands, vibrates the vessel upon its springs, which assist in the rapid and easy vibration of the churn, so as to speedily make the butter come.

What I claim as new, and desire to secure by Letters Patent, is—

1. The springs G, in combination with a cream-vessel, substantially as and for the purposes set forth.

2. The base-board E E', constructed and operating substantially as and for the purposes set forth.

In testimony that I claim the above-described invention I have hereunto signed my name this 23d day of July, 1866.

ISAAC T. PRICE.

Witnesses:
B. W. ADAIR,
JOSEPH M. RUTTER.